(12) United States Patent
Cakmak et al.

(10) Patent No.: US 10,333,176 B2
(45) Date of Patent: Jun. 25, 2019

(54) POLYMER ELECTROLYTE MEMBRANES FOR RECHARGEABLE BATTERIES

(71) Applicants: Mukerrem Cakmak, Munroe Falls, OH (US); Cheng Qu, Akron, OH (US)

(72) Inventors: Mukerrem Cakmak, Munroe Falls, OH (US); Cheng Qu, Akron, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 1128 days.

(21) Appl. No.: 14/457,673

(22) Filed: Aug. 12, 2014

(65) Prior Publication Data

US 2015/0044574 A1 Feb. 12, 2015

Related U.S. Application Data

(60) Provisional application No. 61/864,868, filed on Aug. 12, 2013.

(51) Int. Cl.
| | |
|---|---|
| *H01M 10/26* | (2006.01) |
| *H01M 10/30* | (2006.01) |
| *H01M 10/28* | (2006.01) |
| *B01J 19/12* | (2006.01) |
| *H01M 2/14* | (2006.01) |
| *H01M 2/16* | (2006.01) |

(52) U.S. Cl.
CPC ........... *H01M 10/26* (2013.01); *H01M 2/145* (2013.01); *H01M 2/162* (2013.01); *H01M 2/1646* (2013.01); *H01M 10/30* (2013.01); *H01M 2300/0014* (2013.01); *H01M 2300/0085* (2013.01); *Y10T 29/49115* (2015.01)

(58) Field of Classification Search
CPC ................ H01M 10/26; H01M 10/30; H01M 2300/0014; H01M 2300/0085; H01M 2/145; H01M 2/162; H01M 2/1646
See application file for complete search history.

(56) References Cited

U.S. PATENT DOCUMENTS

| | | | |
|---|---|---|---|
| 5,244,754 A | 9/1993 | Bohmer et al. | |
| 7,618,580 B2 | 11/2009 | Coughlin et al. | |
| 2004/0133177 A1 | 7/2004 | Zucker et al. | |
| 2005/0070193 A1* | 3/2005 | Hennige | B01D 53/228 442/341 |
| 2005/0104258 A1 | 5/2005 | Lennhoff | |
| 2006/0127761 A1* | 6/2006 | Phillips | H01M 4/244 429/207 |
| 2008/0191606 A1 | 8/2008 | Geohegan et al. | |
| 2009/0020921 A1 | 1/2009 | Cakmak et al. | |
| 2009/0026662 A1 | 1/2009 | Yun et al. | |
| 2010/0151311 A1 | 6/2010 | Usami et al. | |
| 2011/0212321 A1 | 9/2011 | Cakmak et al. | |
| 2012/0135333 A1* | 5/2012 | Meredith, III | C08J 5/2275 429/492 |

(Continued)

*Primary Examiner* — Barbara L Gilliam
*Assistant Examiner* — Adam A Arciero
(74) *Attorney, Agent, or Firm* — Renner Kenner Greive Bobak Taylor & Weber

(57) ABSTRACT

An electrolyte membrane for use in a rechargeable battery includes a polymer layer and platelet particles, where the polymer layer is reinforced with a fiber mat, and the polymer layer retains an electrolyte. A rechargeable battery uses the membrane in a position between a positive electrode and negative electrode where the membrane serves as an ion conductor for the battery.

13 Claims, 11 Drawing Sheets

(56) References Cited

U.S. PATENT DOCUMENTS

2012/0153236 A1    6/2012    Cakmak et al.
2013/0101918 A1*  4/2013    Yandrasits .......... H01M 8/1023
                                                        429/482

\* cited by examiner

POLYMER ELECTROLYTE MEMBRANES FOR RECHARGEABLE BATTERIES

CROSS-REFERENCE TO RELATED APPLICATIONS

This application claims priority from U.S. Provisional Application No. 61/864,868 filed on Aug. 12, 2013, the contents of which are incorporated herein by reference.

FIELD OF THE INVENTION

The present invention relates to electrolyte membranes. The present invention relates to fiber reinforced polymer electrolyte membranes. The present invention further relates to fiber reinforced polymer electrolyte membranes having dendrite inhibiting fillers. In some embodiments, the present invention further relates to using the membranes with nickel-zinc (Ni—Zn) batteries to prevent or minimize zinc (Zn) dendrite growth.

BACKGROUND OF THE INVENTION

Rechargeable batteries have been in existence for over 100 years and are currently widely used as energy-storage units, especially in portable electrical devices, such as cell phones and laptop computers. In recent years, rechargeable batteries have also received interest as a power source for electric and hybrid electric vehicles.

However, the cycle life of certain batteries remains relatively low based on known problems with these batteries. Problems that reduce the life of a battery can include dendrite growth during cycling between a charging state and a discharging state leading to a short-circuit event by creating a path between negative and positive electrodes, active materials migrating from electrodes leading to a shape change of the electrodes, and active materials of the electrodes dissolving into an electrolyte solution and passing through the electrolyte separator resulting in electrode contamination.

Previous efforts to prevent or minimize these problems have led to the development of relatively thick electrolyte separators. However, increasing the thickness of a separator results in a reduced energy density of the battery. Reducing this thickness leads to relatively weaker mechanical strength of the membrane materials when in a swollen state. For alkaline batteries that are swollen with potassium hydroxide (KOH) solution, the gel tends to become mechanically weak when one tries to reduce its thickness to increase the efficiency of the battery. Also, a sufficient solution for reducing or blocking the dendrite growth has not yet been developed.

Thus, it is desired to provide improved electrolyte membranes. It is further desired to provide electrolyte membranes that improve the properties of rechargeable batteries.

SUMMARY OF THE INVENTION

In a first embodiment, the present invention provides an electrolyte membrane for use in a rechargeable battery comprising a polymer layer and platelet particles, wherein the polymer layer is reinforced with a fiber mat, and the polymer layer retains an electrolyte.

In a second embodiment, the present invention provides an electrolyte membrane as in the first embodiment, wherein the polymer layer is formed from poly(acrylic acid) and the electrolyte is potassium hydroxide.

In a third embodiment, the present invention provides an electrolyte membrane as in either the first or second embodiment, wherein the fiber mat includes fibers formed of a polymer selected from the group consisting polyvinylidene difluoride and a polyamide produced from m-xylenediamine.

In a fourth embodiment, the present invention provides an electrolyte membrane as in any of the first through third embodiments, wherein the platelet particles are nanoclay platelet particles.

In a fifth embodiment, the present invention provides an electrolyte membrane as in any of the first through fourth embodiments, wherein the platelet particles are dispersed throughout the polymer layer.

In a sixth embodiment, the present invention provides an electrolyte membrane as in any of the first through fifth embodiments, further comprising a second polymer layer on the polymer layer reinforced with the fiber mat, wherein the platelet particles are in the second polymer layer.

In a seventh embodiment, the present invention provides an electrolyte membrane as in any of the first through sixth embodiments, the electrolyte membrane having a thickness, wherein the polymer layer makes up from 65% to 80% of the thickness, and wherein the second polymer layer makes up the remainder of the thickness.

In an eighth embodiment, the present invention provides an electrolyte membrane as in any of the first through seventh embodiments, wherein the polymer layer is formed from poly(acrylic acid), the platelet particles include nanoclay, the fiber mat includes fibers of polyvinylidene difluoride, and the polymer layer includes from 5 to 15 vol.% fibers and from 1 to 5 vol.% platelet particles.

In a ninth embodiment, the present invention provides an electrolyte membrane as in any of the first through eighth embodiments, wherein the polymer layer is formed from poly(acrylic acid), the platelet particles include nanoclay, the fiber mat includes fibers of a polyamide produced from m-xylenediamine, and the polymer layer includes from 5 to 15 vol.% fibers and 1 to 5 vol.% platelet particles.

In a tenth embodiment, the present invention provides a rechargeable battery using an electrolyte membrane as in any of the first through ninth embodiments, wherein the membrane is positioned between a positive electrode and negative electrode and serves as an ion conductor for the battery.

In an eleventh embodiment, the present invention provides a rechargeable battery as in any of the first through tenth embodiments, wherein the rechargeable battery is a nickel-zinc rechargeable battery.

In a twelfth embodiment, the present invention provides a method for preparing an electrolyte membrane for use in a rechargeable battery comprising the steps of preparing a fiber mat, combining a polymer precursor solution with the fiber mat to impregnate the fiber mat with the polymer precursor solution, forming a polymer medium from the polymer precursor solution such that the fiber mat is coated with the polymer medium, and absorbing an electrolyte solution into the polymer medium.

In a thirteenth embodiment, the present invention provides a method as in the twelfth embodiment, wherein the polymer precursor solution comprises a reactive monomer, a photoinitiator, and a cross-linking agent.

In a fourteenth embodiment, the present invention provides a method as in either the twelfth through thirteenth embodiments, wherein the polymer precursor solution further comprises inorganic particles.

In a fifteenth embodiment, the present invention provides a method as in any of the twelfth through fourteenth embodiments, wherein the step of forming a polymer medium is achieved by curing the polymer precursor solution with ultraviolet light.

In a sixteenth embodiment, the present invention provides a method as in any of the twelfth through fifteenth embodiments, wherein, after said step of forming a polymer medium, the method further comprises the step of providing an additional layer of polymer medium on the first formed polymer medium, wherein the additional layer of polymer medium comprises inorganic particles.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

The present invention relates to electrolyte membranes. One or more embodiments of the present invention relates to fiber reinforced polymer electrolyte membranes. One or more embodiments of the present invention further relates to fiber reinforced polymer electrolyte membranes having dendrite inhibiting fillers. One or more embodiments of the present invention further relates to using the membranes with rechargeable batteries to prevent or minimize dendrite growth.

Figure 1:
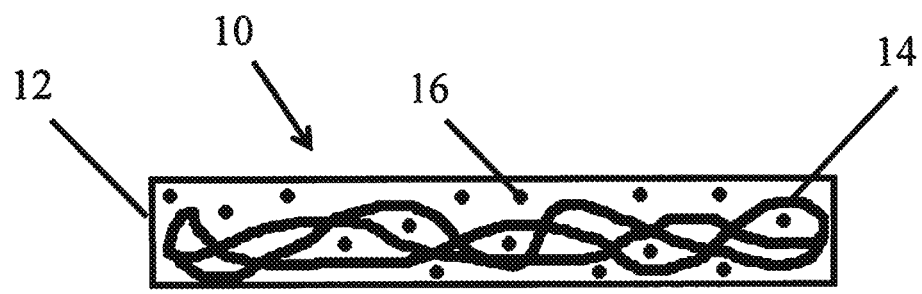
FIG. 1 is a schematic view of an embodiment of the present invention showing a membrane having a polymer electrolyte medium and fibers contained therein.
Figure 15:
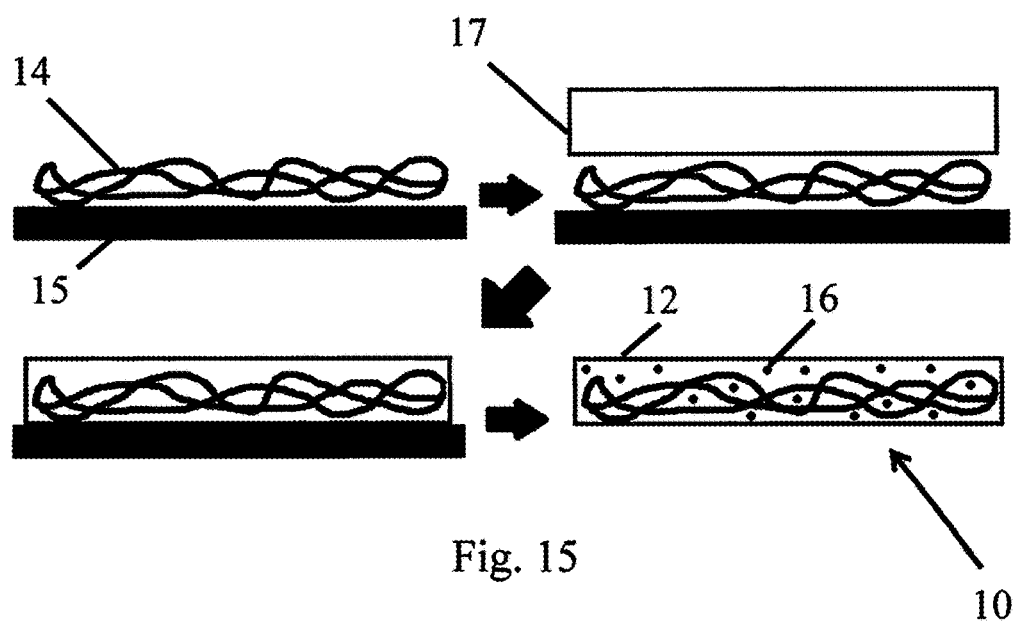
FIG. 15 is a schematic view of an embodiment of the present invention showing a process of making a membrane.

An embodiment of an electrolyte membrane is shown in FIG. 1 and is generally indicated by the numeral 10. The electrolyte membrane 10 includes a polymer electrolyte medium 12 and a fiber mat 14 contained therein. The electrolyte membrane 10 can be formed by first forming a fiber mat on a substrate and then applying a polymer precursor solution to the fiber mat, curing the polymer precursor solution to form a polymer medium, and swelling the polymer medium with an electrolyte solution, as represented by FIG. 15. A polymer precursor solution can comprise a reactive monomer, a photoinitiator, and a cross-linking agent and is cured, such as by curing using ultraviolet (UV) light, or UV curing, to form a fiber reinforced membrane. After impregnating the fiber mat with the polymer precursor solution and curing the same to form a fiber reinforced membrane, the fiber reinforced membrane is immersed in or otherwise exposed to an electrolyte solution to absorb the electrolyte and form the polymer electrolyte medium 12 and, thus, the electrolyte membrane 10. The absorption of the electrolyte is represented by the dots 16 dispersed throughout the fiber reinforced membrane 12.

Figure 2:
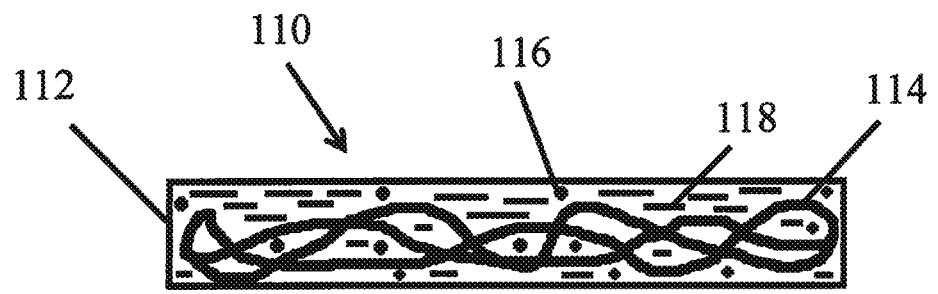
FIG. 2 is a schematic view of an embodiment of the present invention showing a polymer electrolyte medium having platelets therein.

Another embodiment of an electrolyte membrane is shown in FIG. 2 and is generally indicated by the numeral 110. The electrolyte membrane 110 includes a polymer electrolyte medium 112 and a fiber mat 114 contained therein. The electrolyte membrane 110 can be formed by first forming a fiber mat on a substrate and then applying a polymer precursor solution to the fiber mat, curing the polymer precursor solution to form a polymer medium, and swelling a polymer medium with an electrolyte solution, as represented by FIG. 15. A polymer precursor solution can comprise a reactive monomer, a photoinitiator, a cross-linking agent and platelets 118, and is cured, such as by curing using ultraviolet (UV) light, or UV curing, to form a fiber reinforced membrane having platelets dispersed throughout. After impregnating the fiber mat with the polymer precursor solution and curing the same to form a fiber reinforced membrane, the fiber reinforced membrane is immersed in or otherwise exposed to an electrolyte solution to absorb the electrolyte and form the polymer electrolyte medium 112 and, thus, the electrolyte membrane 110. The absorption of the electrolyte is represented by the dots 116 dispersed throughout the fiber reinforced membrane 112.

Figure 3:
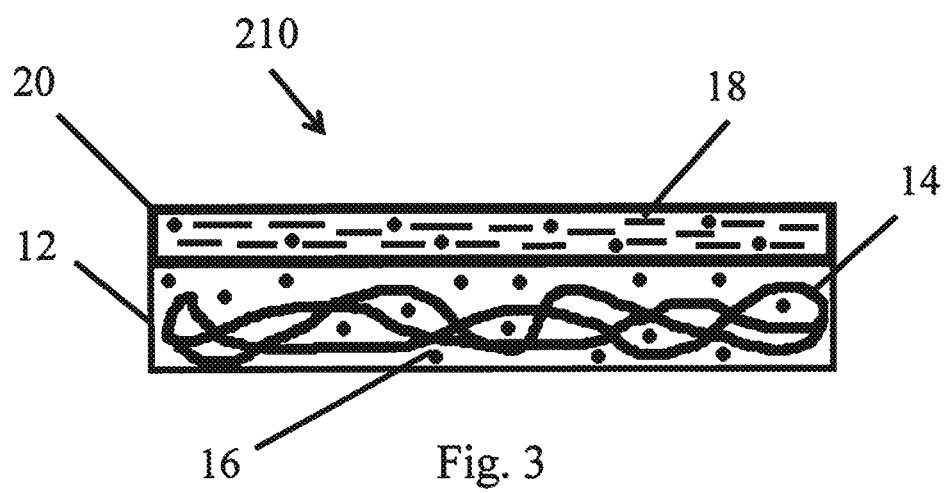
FIG. 3 is a schematic view of an embodiment of the present invention showing a platelet-containing additional layer.

Another embodiment of an electrolyte membrane is shown in FIG. 3 and is generally indicated by the numeral 210. The electrolyte medium 12 and fiber mat 14 of the embodiment of FIG. 1 now includes an additional polymer electrolyte layer 20 thereon where the additional polymer electrolyte layer 20 comprises platelets 18. In some embodiments, a polymer precursor solution having platelets 18 therein is coated onto the cured polymer that ultimately forms the electrolyte medium 12, and this platelet-filed precursor layer is also cured. Then the multi-layer fiber reinforced membrane is immersed in or otherwise exposed to an electrolyte solution to absorb the electrolyte in both the polymer of the electrolyte layer 20 and the polymer of the electrolyte medium, thus forming the electrolyte membrane 210.

Figure 4:
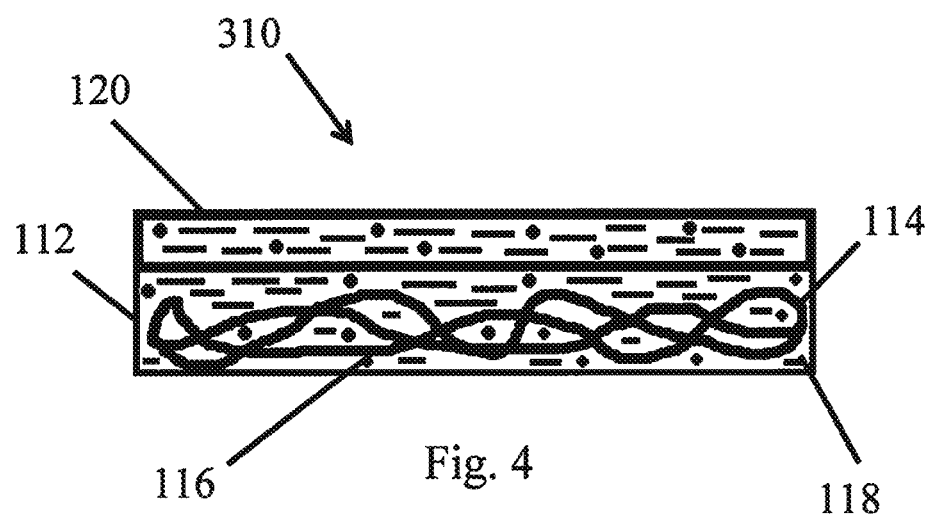
FIG. 4 is a schematic view of an embodiment of the present invention showing a polymer electrolyte medium having platelets therein and showing a platelet-containing additional layer.

Another embodiment of an electrolyte membrane is shown in FIG. 4 and is generally indicated by the numeral 310. The electrolyte medium 112 and fiber mat 114 of the embodiment of FIG. 2 now includes an additional polymer electrolyte layer 120 thereon where the additional polymer electrolyte layer 120 comprises platelets 118. In some embodiments, a polymer precursor solution having platelets 118 therein is coated onto the polymer that ultimately forms the electrolyte medium 112, and this platelet-filed precursor layer is also cured. Then the multi-layer fiber reinforced membrane is immersed in or otherwise exposed to an electrolyte solution to absorb the electrolyte in both the polymer of the electrolyte layer 120 and the polymer of the electrolyte medium, thus forming the electrolyte membrane 310

Figure 5:
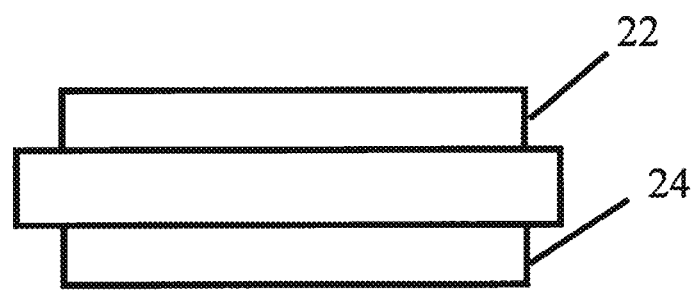
FIG. 5 is a schematic view of an embodiment of the present invention showing a membrane in use between a positive electrode and a negative electrode of a battery.
Figure 6:
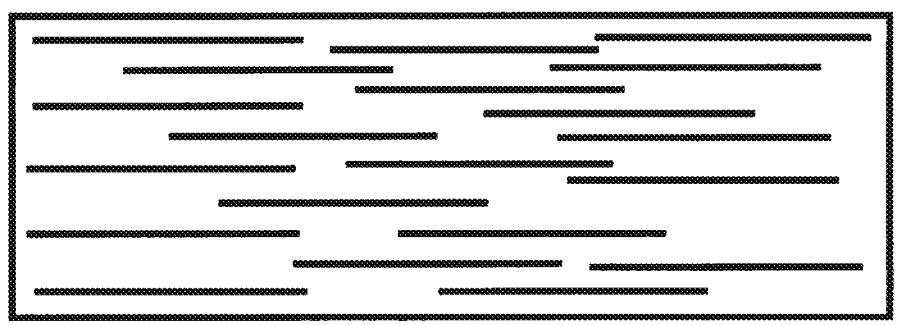
FIG. 6 is a schematic view of an embodiment of the present invention showing platelets within a medium.

As shown in FIG. 5, an electrolyte membrane can serve as the ion conductor in a rechargeable battery between a positive electrode 22 and negative electrode 24. FIG. 6 is a schematic representation of a platelet-containing polymer medium. The electrolyte membranes of this invention can be employed in virtually any battery that can use an electrolyte-containing polymer as an electrolyte layer between electrodes.

The fiber mat adds structural integrity to the polymer medium that retains the electrolyte. To provide strength and minimal impact on the functioning of the electrolyte membrane, the fiber mat, in some embodiments, is formed of fibers having a diameter of less than 1 μm. The fiber mat can be made through known or hereafter developed techniques for forming fibers having a diameter of less than 1 μm. Suitable techniques include electrospinning, gas jet, and other techniques known to those skilled in the art.

The fiber mat can be formed by electrospinning a polymer solution. Electrospinning is a versatile and efficient technique for the fabrication of ultrathin fibers with the diameter ranging from nanometers to micrometers. The setup for electrospinning utilizes a spinneret, a high-voltage supplier, and a collector. The spinneret, or needle, is connected to a syringe in which a liquid polymer solution is contained. With the use of a pump system, the polymer solution is steadily injected out of the spinneret, where a high voltage is applied. In the electric field, thin fibers are produced and collected on the collector, or substrate.

The electrospinning setup and process are generally well known. After a polymer solution is injected out of the spinneret, it forms a pendent drop held by the surface tension and the viscoelastic force of the polymer solution. A high voltage is applied to the spinneret and electrifies the solution pendent drop. Electrons move from the solution into the metal connector, leaving positive charges in the solution. Once created, the positive charges move to the surface of the solution pendent drop by diffusive and convective processes. As a result, the solution drop experiences two major types of electrostatic forces: electrostatic repulsion between excess positive charges and Columbic force to the grounded collector derived from the external electric field. The two electrostatic forces are opposite to the surface tension. The surface tension of the solution drop favors the shape of a sphere with the smallest surface area and the viscoelastic force resists any deformation, while the electrostatic repulsion favors the creation of a jet and the Columbic force tends to pull the jet toward the collector.

Under the influence of the electrostatic forces, the hemisphere drop is elongated and forms a conical shape, known as a Taylor cone. When the applied voltage exceeds a critical value, the electrostatic forces overcome the combination of surface tension and viscoelastic force and a solution jet is ejected from the tip of the Taylor cone. The solution jet leaving the tip is stretched by the electrostatic repulsion of carried charges and pulled toward the collector by the Columbic force. Then the bending perturbation, also called whipping instability, begins because of the electrostatic interactions between the external electric field and the charges on the jet. The growing perturbed jet is quickly bent into a three-dimensional coil with increased diameter due to the surface charge repulsion. In this process, the jet is continuously stretched while a solvent from the liquid polymer solution evaporates. Finally, the stretching stops when the jet reaches the collector and releases the charges, or all the solvent evaporates, leaving behind a dry polymer fiber.

Electrospinning parameters can be manipulated to affect an electrospinning process and control the morphology of electrospun fibers and a fiber mat. Most of the properties of electrospun fibers and a subsequent fiber mat, including fiber diameter, fiber strength, pore size, and porosity, are closely related to the interfiber bonding, which is highly dependent on the electrospinning parameters. Electrospinning parameters can be classified into three categories: (1) processing parameters, including applied voltage, tip-to-collector distance, flow rate, needle type, and needle diameter; (2) solution properties, including surface tension, conductivity, and viscosity, which is influenced by solvent, polymer molecular weight, and concentration; and (3) ambient factors, including temperature, humidity, pressure, and air flow.

The first stage of electrospinning starts when the electrostatic forces overcome the surface tension of the liquid solution and a jet is ejected from the tip of the Taylor cone. The solution jet is elongated in the electric field direction by the Columbic force and the electrostatic repulsion between surface charges, until the whipping occurs and the second stage begins. In the whipping stage, the electrostatic repulsion between residual surface charges further stretches the solution jet. The stretching ends when the electrostatic repulsion equals to the surface tension of solution jet or when all the solvent evaporates. The major forces to stretch the solution jet and change the fiber diameter are Columbic force and the electrostatic repulsion, which are both influenced by the applied voltage. In one or more embodiments, increased fiber diameter is achieved with increasing applied voltage. The effect of increasing the applied voltage on the fiber diameter depends on the solution utilized.

In one or more embodiments, the voltage is in the range of from 22 kV or more to 32 kV or less. In one or more embodiments, the voltage is in the range of from 6 kV or more to 40 kV or less. In one or more embodiments, the voltage is 22 kV or more. In one or more embodiments, the voltage is 32 kV or less.

The target distance is the distance between the needle tip and the collector. In one or more embodiments, the intensity of the electric field drops rapidly within the first 1.5 cm away from the nozzle. In some embodiments, fibers with beads are obtained when the electrospinning distance is less than a predetermined value. In these embodiments, increasing the collecting distance generally results in bead-free fibers with smaller diameters.

At relatively low target distances, the solvent is not completely evaporated when the fibers are collected, resulting in the formation of interfiber bonding. In these embodiments, increasing the target distance results in completely dried electrospun fibers with smaller diameters. However, in some embodiments, the electrospinning distance has no remarkable influence on the fiber diameter.

In one or more embodiments, the target distance is in the range of from 18 cm or more to 30 cm or less. In one or more embodiments, the target distance is in the range of from 10 cm or more to 40 cm or less. In one or more embodiments, the target distance is 18 cm or more. In one or more embodiments, the target distance is 30 cm or less.

The flow of the solution into the needle can be described as the flow rate of an electrospinning process. For a fixed target distance, a higher applied voltage is required for a larger flow rate. There is an optimal flow rate range for good electrospinning. When the flow rate is too high, a continuous solution jet from the needle tip to the collector forms without the occurrence of whipping. When the flow rate is too low, the stable Taylor cone disappears and intermittent spinning occurs due to the insufficient solution supply. Also, the solution feeding rate from the syringe to the pendent drop and the solution consuming rate by the ejection of jet must be relatively equal to maintain a stable electrospinning. When the flow rate is too low, the pendent drop disappears and the beginning of the jet moves to the edge of the spinneret/needle tip. When the flow rate is too high, the pendent drop grows large and dripping occurs because of the gravity. In one or more embodiments, the pressure in the syringe is controlled to adjust the flow rate. The pressure-control method is more precise for low flow rates, and can effectively solve the solution dripping problem.

Needles used for an electrospinning process can have varying diameters. Varying a needle diameter impacts the critical voltage required to initiate the electrospinning. Results indicate that increasing the needle diameter results in an increase of the critical voltage. The needle size also controls the diameter of electrospun fibers in the production of hollow fibers. In general, a needle with a larger diameter facilitates the formation of larger Taylor cone in the electrospinning. The jet ejected from the cone tip is larger and thicker electrospun fibers would be collected.

In one or more embodiments, the inner diameter of a needle is in the range of from 0.6 mm or more to 1 mm or less. In one or more embodiments, the inner diameter of a needle is in the range of from 0.3 mm or more to 1 mm or less. In one or more embodiments, the inner diameter of a needle is 0.3 mm or more. In one or more embodiments, the inner diameter of a needle is 1 mm or less.

In one or more embodiments, needleless spinnerets are used to replace the conventional needles in the electrospinning. A rotating disk and a rotating cylinder are instead used as a spinneret for the electrospinning. Half of the disk and cylinder can be immersed in the solution bath. At low applied voltages, the needless electrospinning system can produce nanofibers with high quality and a higher production rate than conventional needle electrospinning. In one or more embodiments, when the applied voltage is higher than a critical value, such as 70 kV, corona discharge occurs.

Surface tension of a liquid solution is an important parameter in an electrospinning process. During the formation of a Taylor cone, surface tension tends to hold the semi-sphere shape of the pendent drop. After the solution jet is ejected, while electrostatic forces stretch the jet and make it thinner, surface tension tends to keep the large diameter of jet and stops the elongation. Surface tension always acts opposite to the direction of electrostatic stretching force, so the critical applied voltage is largely dependent on the surface tension of a solution.

Even though surface tension plays an important role in the formation of beads and fibers, for some embodiments, particularly solutions with high concentrations or high molecular weight polymers, viscoelastic forces completely dominate the surface tension. In these embodiments, during the electrospinning, viscoelastic forces resist the stretching from electrostatic forces.

Polymer molecular weight and concentration determine the entanglement number of molecular chains in the solution. During the electrospinning, the number of entanglements should be above a threshold number so that the solution jet can form and resist the surface tension. The molecular weight can control the structure during electrospinning and resulting from electrospinning. The molecular weight should be high enough to achieve desired viscosity, and thus entanglement number in the solution, so that a stable fibrous structure can be formed. It should also be low enough so that an intimate mixing between polymer molecules and sol particles occurs during electro spinning.

A liquid polymer solution used for electrospinning includes one or more solvents. The choice of solvents influences the entanglement of the polymer chains in the solution, so it relates to surface tension. The evaporation of a solvent is an important factor for the formation of fibers during electrospinning. Solubility parameters of dispersion forces, polar force, and hydrogen bonding should also be considered when choosing a suitable solvent for a liquid polymer solution.

Suitable solvents include tetrahydrofuran (THF), chloroform, carbon disulfide ($CS_2$), 1-methyl-2-pyrrolidinone (NMP), N,N-dimethylformamide (DMF), isopropyl alcohol, water, N,N-Dimethylacetamide (DMAc), formic acid, acetone, and combinations thereof.

In one or more embodiments, the solvent is made from 70 percent, or approximate thereto, DMF and 30 percent, or approximate thereto, acetone. In one or more embodiments, the solvent is made from 70 percent, or approximate thereto, formic acid and 30 percent, or approximate thereto, NMP.

In one or more embodiments, a liquid polymer solution comprises 20 wt. %, or approximate thereto, polymer and 80 wt. %, or approximate thereto, solvent. In one or more embodiments, a liquid polymer solution comprises 15 wt. %, or approximate thereto, polymer and 85 wt. %, or approximate thereto, solvent. In one or more embodiments, a liquid polymer solution comprises 25 wt. %, or approximate thereto, polymer and 75 wt. %, or approximate thereto, solvent. In one or more embodiments, a liquid polymer solution comprises polymer in a range from 15 wt. % or more to 25 wt. % or less.

Other factors, such as temperature and humidity, are ambient factors for electrospinning. At different temperatures, the properties of a solution are different, including viscosity, surface tension, conductivity, and evaporation rate. In one or more embodiments, the solution viscosity gradually decreases with elevated temperature due to the release of hydrogen bonding between polymer molecules and solvent molecules. At relatively higher temperatures, the electrical conductivity can be enhanced due to the active ionization of polymer molecules and the surface tension can decrease.

In one or more embodiments, the electrospinning temperature is at ambient temperature. In one or more embodiments, the electrospinning temperature is in the range of from 65° F. or more to 100° F. or less. In one or more embodiments, the electrospinning temperature is in the range of from 70° F. or more to 80° F. or less. In one or more embodiments, the electrospinning temperature is 65° F. or more. In one or more embodiments, the electrospinning temperature is 100° F. or less.

The humidity of an electrospinning environment may influence the solvent evaporation, phase separation, and moisture condensation, which can result in different electrospun fiber morphology. At relatively high humidity, electrospun fibers having pores on the surface are often obtained. It is believed that phase separation is one mechanism for this phenomenon. During the electrospinning, the evaporation of solvent decreases the temperature of the surface of fibers.

The thermodynamic instability induces phase separation. And at high humidity, moisture in the air condenses on the relatively cold surface of fibers, generating polymer-poor regions. After the complete evaporation of solvent, pores are formed on the surface of electrospun fibers.

In one or more embodiments, the humidity is in the range of from 20% or more to 70% or less. In one or more embodiments, the humidity is in the range of from 20% or more to 40% or less. In one or more embodiments, the humidity is 20% or more. In one or more embodiments, the humidity is 70% or less.

The interfiber connection is the amount of adhesion between the adjacent electrospun fibers in a fiber mat and this interfiber connection affects the mechanical properties of the fiber mat. The interfiber connection plays an important role in the membranes by holding the electrospun fibers together against stretching when the polymer gel is swelled, such as when a membrane is immersed in an electrolyte solution. The swelling occurs because the polymer gel uptakes at least some of the electrolyte solution, such as a potassium hydroxide aqueous solution. An electrolyte solution can be defined as a solution comprising an electrolyte and a solvent, where a preferred solvent is water.

The types of interfiber connection include van der Waals force, interfiber friction, fiber entanglement, and interfiber bonding. The first two factors depend on the surface roughness and surface area, which is determined by fiber diameter. For certain fibers, interfiber bonds are formed when some extra solvent dissolves the surface of adjacent fibers. The addition of adhesives into electrospun fibers before or after the electrospinning can also effectively create interfiber bonds.

Therefore, interfiber bonding of electrospun fibers can be created or enhanced by changing the electrospinning parameters to control the residual solvent on the electrospun fibers when collected on a collector. Usually electrospun fibers with larger diameters carry more solvent due to relatively low surface area and slow solvent evaporation, forming more interfiber bonding.

Interfiber bonding of fibers can also be improved by thermal treatment after the fiber formation. In one or more embodiments, fibers are thermally treated above the glass transition temperature. In one or more embodiments, the amount of interfiber bonding increases with an increase of temperature. At temperatures above the melting temperature, the fibers melt and fuse together.

A hot press, in which compression is applied to the fibers at relatively high temperature, can also modify the interfiber bonding of a fiber mat. In one or more embodiments, a hot press temperature is at or approximate to the melting temperature of the fibers. This results in the fibers being partially melted and pores forming Hot press can improve the tensile modulus and tensile strength.

A fiber mat maintains a certain morphology, where morphology is the amount of interconnection and fusing among the fibers. The morphology of a fiber mat is influenced by the processing parameters (applied voltage, target distance, flow rate/nozzle pressure, needle type, and needle diameter), solution properties (conductivity, surface tension, and viscosity, which are influenced by solvent, polymer molecular weight, and concentration) and ambient factors (temperature, humidity, pressure, and air flow).

Four main morphologies can be obtained in a fiber mat. These four morphologies are fused, highly bonded, lightly bonded, and separated. A fused morphology means that the fibers are interconnected and some fibers are fully fused together. This can occur in embodiments where the target distance is in the range of 6 cm to 9 cm. A bonded morphology means that the fibers are bonded and entangled, and interfiber bonds are formed between adjacent fibers. This can occur in embodiments where the target distance is in the range of 10 cm to 14 cm. In one or more embodiments, the electrospun fiber mats are highly bonded at lower target distances of 10 cm to 11 cm and the electrospun fiber mats are lightly bonded at higher target distances of 12 cm to 14 cm. The amount of bonding is determined based on the amount of interfiber bonding. A separated morphology means that the fibers are loosely stacked together and minimal or zero interfiber bonds are observed. In one or more embodiments, separated morphology occurs at target distances of 14 cm or more. The morphology can also be affected by manipulating the applied voltage, nozzle pressure, solution concentration, and combinations thereof. The morphology and amount of interconnection in a fiber network in an electrolyte membrane affects the ability of hydroxide ions to transport and can result in lower ionic conductivity. Therefore, mechanical and ionic conductivity properties need to be carefully balanced.

A polymer electrolyte medium having a fiber mat contained therein can be characterized by the volume of fibers with respect to the volume of the medium. In one or more embodiments, a polymer electrolyte medium includes from 3 vol. % or more to 40 vol. % or less fibers. In one or more embodiments, a polymer electrolyte medium includes from 5 vol. % or more to 25 vol. % or less fibers. In one or more embodiments, a polymer electrolyte medium includes from 5 vol. % or more to 15 vol. % or less fibers. In one or more embodiments, a polymer electrolyte medium includes 10 vol. % fibers, or approximate thereto. In one or more embodiments, a polymer electrolyte medium includes 10 vol. % PVDF fibers, or approximate thereto. In one or more embodiments, a polymer electrolyte medium includes 9 vol. % fibers, or approximate thereto. In one or more embodiments, a polymer electrolyte medium includes 9 vol. % MXD6 fibers, or approximate thereto.

It is envisioned that any material capable of forming a fiber mat can be utilized in present invention. Such fibers include thermoplastic fibers, synthetic nonwoven bonded fibers, polyamide fibers, nylon fibers, aliphatic polyamides fibers, aramid fibers, and combinations thereof.

It is further envisioned that any liquid polymer solution that is electrospinnable can be utilized in present invention. Polyamides, including Nylon-MXD6, and polyvinylidene difluoride (PVDF) are envisioned as being particularly useful polymers for forming the fiber mat.

Certain polyamides produced from m-xylenediamine (MXD6) (by Mitsubishi Gas Chemical Co.) can be referred to by the generic name of Nylon-MXD6 (MXD6). Nylon-MXD6 is a semi-crystalline polyamide resin, which is produced through polycondensation of meta-xylylene diamine (MXDA) with adipic acid using Mitsubishi technology. Nylon-MXD6 is a unique aliphatic polyamide resin which contains meta-xylylene groups in the molecule, containing an aromatic ring in its main chain, such as in the following chemical structure.

Nylon MXD6:

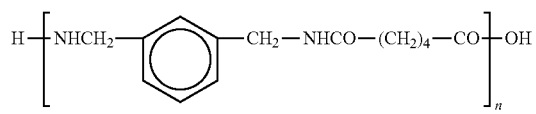

Nylon-MXD6 has one or more of the following favorable characteristics: improved strength and elastic modulus; high glass-transition temperature; low water absorption and moisture permeability; favorable crystallization speed and ease of molding and fabrication; and excellent gas-barrier properties.

Polyvinylidene fluoride, or polyvinylidene difluoride (PVDF), is a highly non-reactive and pure thermoplastic fluoropolymer produced by the polymerization of vinylidene difluoride. PVDF is a specialty plastic material in the fluoropolymer family and is known for its use in applications requiring the highest purity, strength, and resistance to solvents, acids, bases and heat and low smoke generation during a fire event. Compared to other fluoropolymers, it has an easier melt process because of its relatively low melting point of around 177° C. PVDF also has a low density compared to the other fluoropolymers.

Although electrospinning is a facile process for producing a fiber mat useful in this invention, the fiber mat can instead be made through other known or hereafter developed techniques. In some embodiments, the main focus of the fiber mat is to have suitable fiber diameter to provide support for and sufficient conductivity properties to a polymer electrolyte medium.

In one or more embodiments, a fiber mat is characterized by the average fiber diameter of the one or more fibers making up the fiber mat. In one or more embodiments, the average fiber diameter is 500 nm, or approximate thereto; in other embodiments, the average fiber diameter is 300 nm, or approximate thereto; and in other embodiments, the average fiber diameter is 200 nm, or approximate thereto.

In one or more embodiments, a fiber mat is characterized by the maximum fiber diameter of the one or more fibers making up the fiber mat. In one or more embodiments, the maximum fiber diameter is 1 µm or less; in other embodiments, the maximum fiber diameter is 500 nm or less; in other embodiments, the maximum fiber diameter is 300 nm or less; and in other embodiments, the maximum fiber diameter is 200 nm or less.

A membrane can be formed by first forming a fiber mat on a collector, or substrate, and then applying a polymer precursor solution to the fiber mat. The polymer precursor solution forms a polymer medium containing the fiber mat therein. In these embodiments, the membrane is removed from the substrate in order to be used. A metal plate is an example of a suitable collector for making a membrane. In general, the use of a process comprising a collector allows a roll-to-roll process to be utilized for forming an electrolyte membrane. The substrate is moved under a fiber-spinning apparatus such as an electrospinning apparatus or nanofibers-by-gas-jet apparatus and the fibers deposited thereon as a mat—this deposition could be continuous or step-wise, though continuous provides a more efficient process. The substrate then continues on to a location for receipt of the polymer precursor solution, which may or may not contain platelets, as will be appreciated from the embodiments disclosed at FIGS. 1-4. The precursor solution is rolled into the fiber mat to ensure penetration through the pores thereof and a good coating of the fiber mat. The coated fiber mat is carried to a curing area to cure the polymer precursor solution. Thereafter, optional additional layers, such as a polymer precursor solution layer including platelets can be deposited in a like manner. The order of such layers could also be reversed, with a polymer precursor platelet-containing layer first deposited, and the fiber mat formed thereon and receiving the polymer precursor layer. The electrolyte could be incorporated thereafter as part of a roll-to-roll process or the product could be taken up on a roll to later have the electrolyte incorporated therein, or in discrete portions thereof cut off of the roll.

In other embodiments, a fiber mat is formed and then immersed in a polymer precursor solution to coat the fiber mat therewith. The polymer precursor solution is then cured to form a polymer medium having the fiber mat embedded therein. Platelets may be included in the polymer precursor solution or could be supplied in a separate polymer precursor layer applied after curing the polymer medium or could be both included in the polymer precursor solution and supplied in a separated polymer precursor layer applied after curing the polymer medium.

It is envisioned that any polymer medium that is capable of having fibers or platelets or both fibers and platelets therein and able to absorb the desired electrolyte can be utilized in present invention. Particular polymers for forming a polymer membrane include hydrogels, polyelectrolytes, and combinations thereof. Polyelectrolytes are known to those skilled in the art and are those polymers with the ability to absorb and retain water and swell to many times their original volume.

A polymer medium can be formed using a polymer precursor solution. In some embodiments, the polymer precursor solution includes a reactive monomer, a photoinitiator, and a cross-linking agent. The polymer precursor solution is cured or polymerized, such as by UV curing, to form a polymer electrolyte medium.

One skilled in the art will appreciate suitable monomer that can be utilized within a polymer precursor solution for forming a polymer medium. The reactive monomer is any monomer that can form a polymer medium capable of absorbing a suitable electrolyte. Particular reactive monomers include acrylic acid, potassium acrylate, sodium acrylate, other acrylates, and combinations thereof.

A photoinitiator is any chemical compound that can decompose into free radicals when exposed to light. Photoinitiators are used to promote a polymerization reaction. A photoinitiator is a compound especially added to a formulation to convert absorbed light energy, UV or visible light, into chemical energy in the form of initiating species, viz., free radicals, or cations. Based on the mechanism by which initiating radicals are formed, photoinitiators can be divided into two classes. Type I photoinitiators undergo a unimolecular bond cleavage upon irradiation to yield free radicals and Type II photoinitiators undergo a bimolecular reaction where the excited state of the photoinitiator interacts with a second molecule (a coinitiator) to generate free radicals. Examples of suitable photoinitiators include 1-hydroxycyclohexyl phenyl ketone and 2-Hydroxy-2-methyl-1-phenyl-propan-1-one.

Cross-linking is used in polymer chemistry and a cross-linking agent is used to form cross-links between one polymer chain to another. The cross-links are bonds that connect the polymer chains. Cross-links can be formed by chemical reactions that are initiated by heat, pressure, change in pH, or radiation. The use of a cross-linking agent in a polymer precursor solution results in a chemical reaction that forms the cross-links. Cross-linking can also be induced in materials that are normally thermoplastic through exposure to a radiation source, such as electron beam exposure, gamma-radiation, or UV light. An example of a suitable cross-linking agent is N,N'methylenebisacrylamide (BIS).

Poly(acrylic acid) (PAA) is a preferred polymer for forming a polymer medium. PAA can be used as the host material of the polymer electrolyte. Poly(acrylic acid) is a widely used hydrogel material, which has high water-absorbing capacity and high water-holding capacity. The gel strength of PAA is weak, so PAA can be used after cross-linking or with some other high-strength polymers. PAA can be synthesized through thermally induced polymerization and cross-linking of acrylic acid monomers. Its high water-absorbing and water-holding capacity gives the PAA-based polymer electrolyte high ionic conductivity. Its poor mechanical strength can be compensated by cross-linking and/or hybriding with other polymers.

For PAA and other polymers, the fiber mats are embedded in gel polymer membrane to obtain a fiber-reinforced polymer electrolyte membrane, where the fiber mat serves as a skeleton providing mechanical support. The gel polymer then is able to retain a solution for ion transportation.

In one or more embodiments, the polymer precursor solution can further include platelets or platelets can be introduced in a separate polymer precursor layer, as described above. In some embodiments, the platelets are small, flat, long particles that make up some substances such as clay. The size and shape of the platelets themselves affect the plasticity, workability, and shrinkage overall substance. In one or more embodiments, the platelets are oriented parallel to a shear plane, particularly where a solution is cast by shear flow.

In addition to clay, other suitable fillers include zirconium dioxide, calcium titanate, magnesium titanate, zinc magnesium titanate, lead titanate, calcium zirconate, polyethylene micro-spheres, and combinations thereof.

Nanoclay materials are particularly useful clays. Nanoclays are nanoparticles of layered mineral silicates. Nanoclay is based on a natural mineral for polar polymers having optimized polarity to enable intercalation and possibly exfoliation. A particularly useful nanoclay is Lucentite SWN (also known as synthetic smectite or lithium magnesium sodium silicate) manufactured by CO-OP Chemical. This nanoclay is particularly useful for use in aqueous solutions.

Membranes having a polymer medium with fibers and platelets therein can also be referred to as hybrid membranes. As discussed herein, the fibers serve as a skeleton and provide dimension stability and mechanical strength, while the platelets disperse among fibers and block the zinc dendrites. A hybrid membrane's performances in a Ni—Zn battery can depend on the thickness of the hybrid membrane and charge-discharge rate.

In one or more embodiments, a membrane can be a multilayer membrane. A first layer comprises a polymer medium having fibers therein and a second layer comprises a polymer medium having platelets therein. The first layer provides mechanical strength to the membrane and the second layer blocks the dendrite growth. The first layer can also comprise platelets for blocking dendrite growth. In one or more embodiments, a first layer includes MXD6 fibers in a PAA polymer medium and a second layer includes clay in a PAA polymer medium In embodiments where a membrane comprises inorganic filler, or platelets, the membranes can be characterized by the volume percentage of platelets within a polymer medium. In one or more embodiments, a polymer medium comprises from 1.7 vol. % or more to 3.8% or less platelets. In one or more embodiments, a polymer medium comprises from 1 vol. % or more to 5 vol. % or less platelets. In one or more embodiments, a polymer medium comprises 1.7 vol. % platelets or approximate thereto. In one or more embodiments, a polymer medium comprises 3.8 vol. % platelets or approximate thereto.

A membrane can be characterized by the thickness of the membrane or by the thickness of a polymer medium layer. In one or more embodiments, a membrane thickness is in a range from 200 μm or more to 300 μm or less. In one or more embodiments, a membrane thickness is in a range from 100 μm or more to 500 μm or less. In one or more embodiments, a membrane thickness is 200 μm or approximate thereto, in other embodiments 250 μm or approximate thereto, and in other embodiments 300 μm or approximate thereto.

In embodiments having multiple layers, a first layer can account for 75% or approximate thereto of the total membrane thickness, with the second layer accounting for 25% or approximate thereto of the total membrane thickness. In embodiments having multiple layers, a first layer can account for from 30% or more to 90% or less of the total membrane thickness, with the second layer accounting for the remainder.

To convert a polymer precursor solution into a polymer medium, the polymer precursor solution is cured or polymerized. One example of curing is by UV curing, such as by a mercury-vapor UV lamp. Other ways of curing or polymerizing include thermal curing and chemical curing.

A fiber-containing polymer medium, a platelet-containing polymer medium, and a fiber and platelet containing polymer medium are capable of serving as an electrolyte for a battery after an electrolyte solution is applied to the membrane or the membrane is placed in and allowed to absorb at least some of an electrolyte solution. An electrolyte is the ion conductor in a battery between the positive electrode and negative electrode. An electrolyte should enable the transfer of ions to facilitate the chemical reactions of active materials on the electrodes.

Electrolyte solution is a solution of one or more salts, i.e. the mobile ion provider, dissolved in a solvent. Suitable salts, or electrolytes, that can be used in an electrolyte solution to swell a polymer membrane include KOH, lithium hydroxide (LiOH), sodium hydroxide (NaOH), and combinations thereof.

In some rechargeable batteries, particularly some Ni—Zn batteries, a 30 wt. % KOH aqueous solution is initially used as electrolyte to achieve the maximum conductivity. The properties, such as ionic conductivity, dimensional stability, mechanical strength, and electrochemical stability, are dependent on the content of polymer in the liquid electrolyte. Polymer electrolyte functions as both electrolyte and separator in a battery, and the safety properties of the battery are enhanced due to the low volatility and high viscosity of polymer gel. Generally the cross-linking density is proportional to the concentration of cross-linker.

Preferred polymer electrolytes, or polymer electrolyte membranes, for use in rechargeable batteries should have one or more of the following properties: sufficient conductivity, electrochemical stability, compatible with electrodes, thermal stability, mechanical stability, sufficient interface, and available raw materials.

A polymer electrolyte should be electrochemically stable in a voltage window defined by the electrode reactions. A polymer electrolyte should be chemically and electrochemically compatible with electrodes. A polymer electrolyte should be stable in the range of operation temperature. A polymer electrolyte should have sufficient mechanical strength as the mechanical strength is important during processing and production of battery. A polymer electrolyte should provide an interface between electrolyte and electrode, as this interface is important for reactions. The raw materials used for a polymer electrolyte should have an abundant source and be inexpensive.

Where a membrane is used within a battery, an electrolyte solution such as aqueous KOH is combined with the polymer medium. Due to this solution, polymer electrolytes without fibers therein tend to exhibit poor mechanical strength and dimensional stability. As a polymer electrolyte membrane needs to be folded and packed during the assembly of a battery, it is necessary to reinforce a polymer electrolyte with the fibers so that no defect or damage of the polymer electrolyte membrane is caused during battery assembly. The fibers serve to provide reinforcement to a polymer medium. The fibers transmit the tensile forces along the length direction and dissipate the energy in the fiber reinforced composite. Therefore, the inherent mechanical properties of a fiber mat are important to the reinforcement effect.

Annealing the fibers at temperatures above glass transition temperature is another method to achieve improved mechanical properties. Annealing can increase the crystallinity and change the morphology of the fibers. Annealing can also enhance interfiber bonding and reinforce Young's modulus.

Ionic conductivity of a polymer electrolyte membrane can be measured using a complex impedance method using a multi-frequency LCR meter (Hewlett Packard 4274A) at room temperature. The membrane is sandwiched between two stainless steel electrodes, and the impedance is measured in the 100 kHz-100 Hz frequency range. The magnitude of the impedance |Z| and the phase angle θ were recorded for each frequency. The applied voltage was fixed at 1V throughout the experiment. With the data of |Z| and θ, a complex impedance plot of Z" versus Z', where Z"=|Z| sin θ and Z'=|Z| cos θ, was made and the bulk resistance $R_b$ was obtained. Then the ionic conductivity σ of the polymer electrolyte membrane was calculated:

$$\sigma = \frac{L}{R_b A}$$

where L represents the membrane thickness and A is the contact area between membrane and electrode.

Describing the above in more detail, sufficient ionic conductivity is critical for a reasonable current density. In one or more embodiments, the ionic conductivity is $10^{-5}$ S/cm or more. In one or more embodiments, the ionic conductivity is in a range from $10^{-3}$ S/cm or more to $10^{-1}$ S/cm or less. This range is particularly ideal at room temperature. In one or more embodiments, the ionic conductivity is $5 \times 10^{-2}$ S/cm.

Membranes of the present invention can be used within any suitable rechargeable battery. Membranes of the present invention are particularly useful within any rechargeable battery that is prone to suffering from dendrite growth. Examples of suitable rechargeable batteries include nickel-zinc batteries, nickel cadmium batteries, nickel metal hydride batteries, and lithium ion batteries.

Where a membrane is utilized within a battery, nickel-zinc batteries are particularly useful. Ni—Zn electrochemical systems are currently utilized in rechargeable batteries. These systems can use nickel oxide hydroxide (NiOOH) as the active material at the positive electrode and zinc at the negative electrode. When the battery is discharged, NiOOH is reduced to NiOH and zinc is oxidized to zinc oxide (ZnO) or zinc hydroxide (ZnOH)$_2$ which dissolves in alkaline solution to form zinc hydroxide ions:

NiOOH+H$_2$O+$e^-$ ⇌ Ni(OH)$_2$+OH$^-$

Zn+2OH$^-$ ⇌ Zn(OH)$_2$+2$e^-$

Zn(OH)$_2$+2OH$^-$ ⇌ Zn(OH)$_4^{2-}$

The overall reaction during charge-discharge is:

2Ni(OH)$_2$ + Zn(OH)$_2$ $\underset{\text{discharge}}{\overset{\text{charge}}{\rightleftharpoons}}$ 2NiOOH + 2H$_2$O + Zn If the battery is overcharged, oxygen is produced at the nickel electrode and hydrogen is produced at the zinc electrode:

4OH$^-$→O$_2$+2H$_2$O+4$e^-$

2H$_2$O+2$e^-$→H$_2$+2OH$^-$

The corrosion of the zinc electrode can occur. Zinc is oxidized to Zn(OH)$_2$ and dissolves in electrolyte aqueous solution. This changes the shape of the zinc electrode.

Zn+2H$_2$O→Zn(OH)$_2$+H$_2$

For these batteries, nickel hydroxide is the electrochemically active material of the nickel electrode, and it is supported by a structural component in the nickel electrode. Carbonyl nickel powders are sintered to form a porous structure as the support in sintered nickel electrodes, while nickel foam is used as the support in non-sintered nickel electrodes. Current collector material, such as nickel wire mesh or nickel-plated steel, is contained in most of the nickel electrodes.

Zinc electrodes are prepared by pressing, pasting or electrodepositing zinc oxide. In some cases, polytetrafluoro ethylene (PTFE; Teflon®) binder is used to bond the zinc oxide powders together. The zinc electrode also contains current collector material, such as copper mesh and copper plate. Zinc electrodes for rechargeable batteries are usually manufactured in discharged state, and they need several cycles of activation to be fully functional. Typical nickel-zinc rechargeable batteries use from 20% to 50% potassium hydroxide (KOH) aqueous solution as the electrolyte solution.

Ni—Zn batteries can have twice the energy density as of nickel-cadmium batteries, and both nickel and zinc are nontoxic, easy to recycle, and are abundant in nature. In addition, Ni—Zn batteries also have fast recharge capability, high open-circuit voltage, low self-discharge rate, maintenance-free design and relatively low cost per Watt-hour. However, the low cycle life due to zinc dendrite growth and shape change of zinc electrode has previously limited the commercialization of these batteries.

One issue with rechargeable batteries, such as Ni—Zn batteries, is the formation of dendrites. For Ni—Zn batteries, over the course of several battery charge/discharge cycles, particularly when the battery is cycled at a fast rate, microscopic fibers of zinc, called dendrites, sprout from the surface of the zinc electrode and spread across the electrolyte until they reach the other electrode. An electrical current passing through these dendrites can short-circuit the battery, causing it to rapidly overheat and in some instances catch fire.

Zinc active material in the discharged state is soluble in the alkaline electrolyte, and this leads to the zinc dendrite growth problem. During discharge, zinc is oxidized from metallic zinc to zinc hydroxide ions (Zn(OH)$_4^{2-}$), which dissolves in the alkaline electrolyte. And during charge, the zinc hydroxide ions are reduced to metallic zinc and are deposited back to the electrode. If the surface of zinc electrode is not sufficiently uniform, zinc preferentially migrates to the spots that are closer to the nickel electrode and forms zinc dendrites. After cycles of charge and discharge of the battery, the zinc dendrites gradually grow until the electrolyte membrane is penetrated and short-circuit occurs. Membranes of the present invention have the ability to inhibit dendrite growth, particularly the growth of zinc dendrites within Ni—Zn batteries.

Batteries can be characterized by the number of charge-discharge cycles before the battery fails. A battery is said to fail when its capacity drops to 0. But when the capacity drops to a low level, people generally stop using it. Thus, as used herein, "battery failure cycle life" is the cycle number when the battery capacity drops to 0 and the "battery life" is the cycle number when the capacity drops to 30%. In general, the amount of charge-discharge cycles that are required of a battery for commercial viability is in the range of 400-500 cycles.

Results show that membranes of the present invention allow batteries to achieve at least up to 1780 cycles with respect to the battery's failure cycle life, and at least up to 628 cycles with respect to the battery's life.

Figure 9:
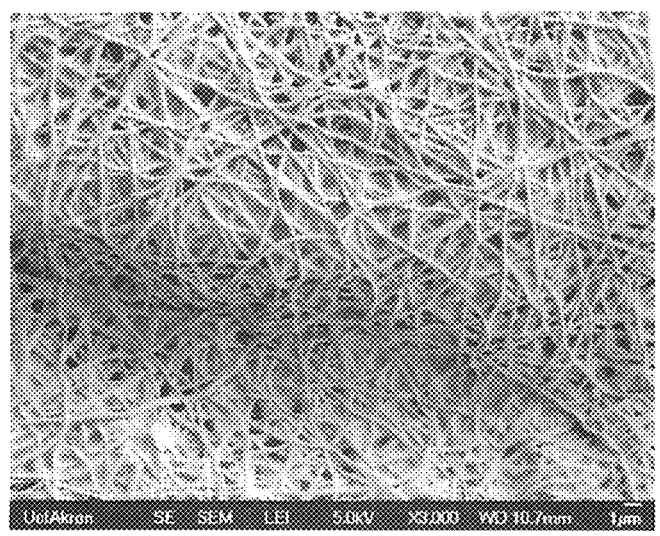
FIG. 9 is a scanning electron microscope (SEM) image after a folding test (folded the membrane 20 times) for a poly(acrylic acid) (PAA)/MXD6 fiber membrane.
Figure 10:
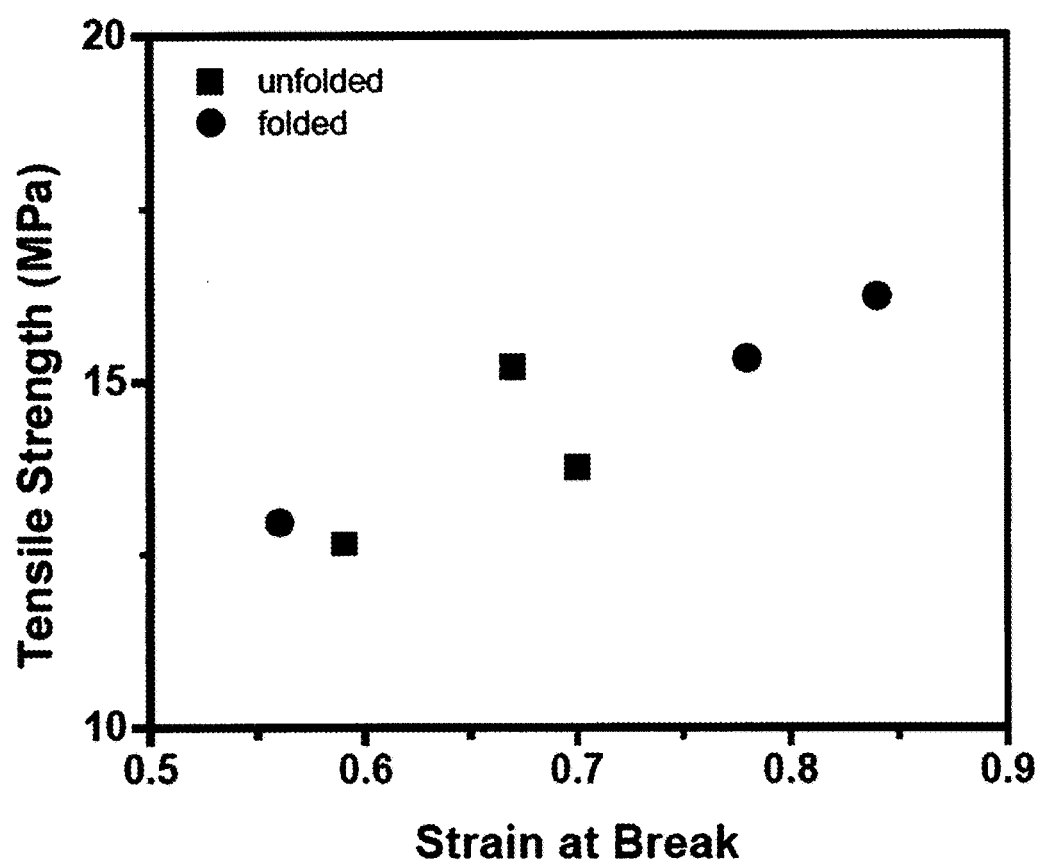
FIG. 10 is a graph showing a property for a PAA/MXD6 fiber membrane with and without folding.

Embodiments of the present invention include polymer electrolyte membranes having excellent flexibility, so they can be folded during transportation or battery manufacturing. In a particular representation, a membrane can be folded 20 times and neither the fibers nor the polymer gel are damaged. FIG. 9 is an SEM image representative of a membrane comprising PAA and MXD6 fibers following a folding test. Tensile strength and strain using break point testing of a polymer electrolyte membrane also shows that these properties are well maintained after the folding test, as shown in FIG. 10.

A method of preparing and using a membrane can include one or more of the following steps: preparing a polymer solution for electrospinning, manipulating the electrospinning parameters, electrospinning a polymer solution, forming an electrospun fiber mat, forming a fiber mat, preparing a polymer precursor solution, adding a polymer precursor solution to a fiber mat, immersing a fiber mat in a polymer precursor solution, pressing a solution containing a fiber mat therein with rollers, allowing a polymer precursor solution to form a polymer medium, allowing a polymer precursor solution to form a polymer medium by UV curing the polymer precursor solution, combining inorganic particles with a polymer precursor solution, adding an additional layer of polymer precursor solution containing inorganic particles on to a formed polymer medium, forming an additional layer of inorganic-particle-containing polymer medium, immersing a membrane in a KOH aqueous solution for swelling, removing a membrane from an electrospinning collector, removing a polymer medium from a substrate, and using a membrane as a polymer electrolyte membrane in a rechargeable battery.

In general, the fiber mat is produced and is impregnated with a polymer precursor solution that is then cured to form the polymer medium. The polymer precursor solution can be applied to the fiber mat or the fiber mat can be immersed in the polymer precursor solution. This is a simple form of an electrolyte membrane in accordance with this invention.

By way of example only, FIG. 15 provides one or more embodiments of a process of the present invention. To form an electrolyte membrane 10, a fiber mat 14 is first formed on a collector or substrate 15. Once the fiber mat 14 is formed, a polymer precursor solution 17 is applied to the fiber mat 14 to impregnate the fiber mat 14 with the polymer precursor solution 17. Then the polymer precursor solution 17 is cured to form a fiber reinforced polymer membrane. The fiber reinforced membrane is then immersed in or otherwise exposed to an electrolyte solution to absorb the electrolyte and form the polymer electrolyte medium 12 and, thus, the electrolyte membrane 10. The absorption of the electrolyte is represented by the dots 16 dispersed throughout the fiber reinforced membrane 12.

A particular sequential method of making and using a membrane will now be described. A fibrous mat is first obtained by electrospinning a polymer solution. A polymer solution can be 20 wt. % polyvinylidene fluoride with 80 wt. % solvent, where the solvent is 70% DMF and 30% acetone. A polymer solution can be from 15 to 25 wt. % polyvinylidene fluoride with 75-85 wt. % solvent, where the solvent is 70% DMF and 30% acetone. A polymer solution can be 20 wt. % nylon MXD6 with 80 wt. % solvent, where the solvent is 70% formic acid and 30% NMP. A polymer solution can be from 15 to 25 wt. % nylon MXD6 with 75-85 wt. % solvent, where the solvent is 70% wt. % formic acid and 30% wt. % NMP.

The morphology of a fibrous mat (e.g. diameter of nanofibers, their adhesion to one another) can be controlled by adjusting the molecular weight of a polymer, the concentration of a polymer in a solution, and the parameters of electrospinning, such as voltage, target distance, and pressure in a delivery system. The thickness of a fibrous mat can be controlled by adjusting the electrospinning time.

After a fibrous mat is formed, a precursor solution can be obtained by mixing certain amounts of monomers, additives, and potassium hydroxide aqueous solution. A particular precursor solution includes acrylic acid (AA) monomer, 1-hydroxycyclohexyl phenyl ketone (HPK), N,N'-methylene bisacrylamide (BIS), and a 50 wt. % in water KOH solution mixed at a weight ratio of 100:1:5:150, respectively, at room temperature.

After a precursor solution is prepared, the solution can be poured on the prepared fibrous mat. This can be followed by pressing with rollers. This roller step can also be accomplished on a roll to roll process by passing through roller mills, which forces some or all of the liquid into the fibrous mat. After the fibrous mat absorbs some or all of the precursor solution, the extra solution on the surface of fibrous mat can be removed.

Then, an amount of inorganic particles can be mixed with the prepared precursor solution now containing the fiber mat therein. The inorganic particles can also be added to a polymer precursor solution before the solution is added to the fiber mat. Clays are particularly useful inorganic particles, but similar nanoparticles can be employed as well. A particular clay is LUCENTITE-SWN from the Japanese manufacturer CO-OP CHEMICAL CO., LTD. Where utilized, a preferred concentration of inorganic particles in a solution is 10 wt. %. Where utilized, inorganic particles can be present in a range from 1 wt. % to 20 wt. %.

Multilayer membranes can also be prepared. In one or more embodiments, a multilayer membrane is prepared by casting a solution onto a substrate and then pressing a membrane onto the cast solution. In one or more embodiments, a multilayer membrane is prepared by casting a solution directly onto a membrane. Where multilayer membranes and inorganic particles are utilized, either or both of the layers can comprise inorganic particles.

The one or more polymer precursor solutions are cured to form one or more polymer mediums. This curing can be done using mercury type UV radiation. This results in in-situ polymerization and cross-linking of monomers in the precursor solution. In a particular roll to roll process, line speed is 100 cm/min and the intensity is 30% of the maximum of the UV lamp. In another particular roll to roll process, the intensity is in a range from 10-50% and the speed is in a range from 50 to 400 cm/min.

Once a membrane is cured, the membrane can be immersed in a solution for swelling. A particularly useful solution is a KOH aqueous solution. This swelling allows a membrane to serve as a polymer electrolyte membrane, such as for a rechargeable battery. After a membrane sufficiently absorbs a solution, a polymer electrolyte membrane is obtained.

EXAMPLES

Example A

Preparation of an Electrospun Fiber Mat 20 wt % PVDF/dimethylformamide (DMF)/acetone solution was made by dissolving PVDF (Kynar® FLEX 2800, Arkema) in a 7:3 w/w mixture of DMF (Aldrich) and acetone (Aldrich) using a planetary centrifugal mixer at room temperature. 20 wt. % MXD6/formic acid/N-Methyl-2-pyrrolidone (NMP) solution was obtained by dissolving MXD6 (S6121, Mitsubishi Gas Chemical) in a 7:3 w/w mixture of formic acid (Aldrich) and NMP (Aldrich) using the same method. Then the solutions were loaded into a specially designed Teflon® container. A syringe pump and a pressure sensor were connected to the Teflon® bottle so that the nozzle pressure could be controlled. A voltage supply cable was connected to a metal tube underneath the Teflon bottle, where a dispensable needle with the inner diameter of 0.6 mm was attached. A metal plate with the size of 30 cm×30 cm was used as the collector. The metal collector was installed on two crossed linear actuators so that an X-Y movement was achieved. The electrospinning was carried out in a sealed chamber in which the relative humidity was controlled and the temperature was kept at room temperature. The electrospun fiber mat was obtained after 2 to 6 hours of electrospinning to achieve a desired thickness.

Example B

Preparation of an Electrospun-Fiber-Reinforced Polymer Electrolyte Membrane Acrylic acid (AA) monomer, 1-Hydroxycyclohexyl phenyl ketone (HPK) (photoinitiator), N,N'-methylene bisacrylamide (BIS) (cross-linking agent), and 50 wt % KOH solution (all from Aldrich) were mixed by the weight ratio of 100:1:5:150 at room temperature to get a precursor solution. The electrospun fiber mat was immersed in the prepared precursor solution until fully saturated, and then after removing extra solution from both surfaces, the membrane was cured by a mercury-vapor UV lamp. The polymerization and cross-linking mechanisms of the precursor solution include radical formation, free radical polymerization, and cross-linking. A process of preparing a fiber-reinforced membrane is described above. The cured membrane was immersed in 30 wt. % KOH solution for 24 hours to obtain a polymer electrolyte membrane.

Example C

Preparation of a PAA/Fiber/Clay Hybrid Polymer Electrolyte Membrane

The electrospun fiber mat was immersed in a mixed and ultrasonicated precursor/clay solution until fully saturated, and then after removing extra solution from both surfaces, the membrane was cured by a mercury-vapor UV lamp. A process of preparing the fiber PAA/fiber/clay hybrid membrane is described above. The cured membrane was then immersed in 30 wt % KOH solution for 48 hours to obtain a hybrid polymer electrolyte membrane.

Example D

Preparation of a PAA/Fiber/Clay Multilayer Polymer Electrolyte Membrane

The fiber layer was prepared by immersing electrospun fiber mat in an AA/HPK/BIS/KOH precursor solution and removing the extra solution from both surfaces. The clay layer was prepared by casting mixed and ultrasonicated precursor/clay solution on a fiber layer using a double doctor blade. Then it was cured by a mercury-vapor UV lamp and immersed in 30 wt % KOH solution for 48 hours to obtain a multilayer polymer electrolyte membrane.

Example E

Preparation of a Nanocomposite Polymer Electrolyte Membrane

Clay (Lucentite SWN, CO-OP Chemical) was added into the precursor solution. To exfoliate the clay platelets, ultrasonication was applied to the mixture for a time from 5 to 10 minutes using an ultrasonicator (Hielscher UP400S). The precursor/clay solution was cast on a corona-treated carrier film using a double doctor blade, where the doctor blade was fixed while the carrier film moved at a speed of 100 cm/min. The solution layer was cured by a mercury-vapor UV lamp and then it was immersed in 30 wt % KOH solution for 24 hours to get a PAA/clay electrolyte membrane.

Example F

Nanocomposite Polymer Electrolyte Membrane

Since clay particles can exhibit very large surface area at very small thicknesses when exfoliated (e.g. 2 nm), they can be incorporated into a membrane to act as shields against the growth of Zn dendrites. For this, clay platelets were added into PAA electrolyte, and the solution was cast by shear flow leading these platelets to orient parallel to the shear plane. Thus, the clay increased the tortuosity to the dendrites that tended to grow in the gap in the direction towards the Ni electrode. Ions could still conduct in the swollen electrolyte. With an increase of clay content in the PAA/clay electrolyte membrane from 0 vol.% to 8 vol. %, the ionic conductivity of membrane gradually decreased from about 0.11 S/cm to 0.05 S/cm.

Figure 12:
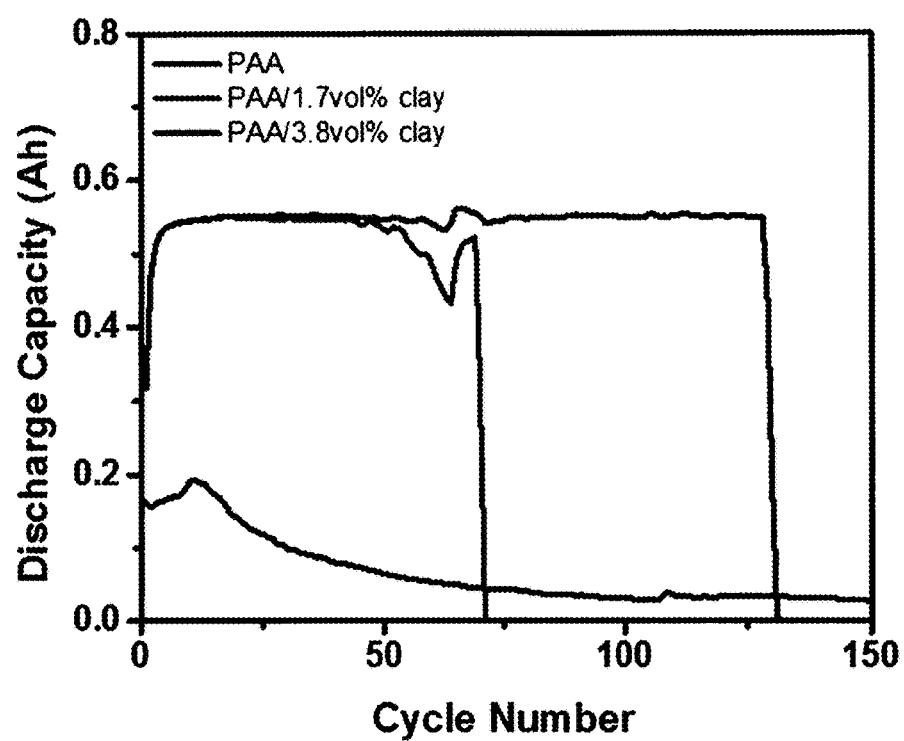
FIG. 12 is a graph showing a property for a PAA membrane with differing clay contents.

To achieve high charge and discharge capacities in a Ni—Zn rechargeable battery, fast transportation of hydroxide ions is required, so membranes with 1.7 vol % and 3.8 vol % clay were used as electrolyte membranes for battery testing. Due to the brittleness of PAA/clay membranes, small batteries with 0.56 Ah capacities were built for the battery testing. These results are given in FIG. 12. The battery with PAA membrane exhibited less than 0.2 Ah discharge capacity during the whole battery testing due to the lack of mechanical strength and inhibition capability against Zn dendrite growth. For both batteries with PAA/clay electrolyte membranes, the discharge capacities started from low levels but quickly jumped to 0.56 Ah and remained stable until battery failure. The PAA/1.7 vol % clay membrane had a 70-cycle battery life, and the PAA/3.8 vol % clay membrane extended the battery life to 130 cycles. The results support the belief that the addition of exfoliated clay platelets eliminated the electrode migration problem and suppressed Zn dendrite growth. Morphology observation on the non-short-circuit regions of these electrolyte membranes after battery testing confirmed the dendrite inhibition effect of clay. In both PAA/clay electrolyte membranes, no Zn dendrite clusters were found on the Ni electrode side of the membrane, indicating that Zn dendrite growth in the membranes was suppressed by clay barriers.

Example G

PAA/Fiber/Clay Hybrid Polymer Electrolyte Membrane

PAA/fiber/clay hybrid polymer electrolyte membranes were produced. One hybrid membrane included PAA/10 vol % PVDF-fiber/3.8 vol % clay. One hybrid membrane included PAA/9 vol % MXD6-fiber/3.8 vol % clay. Both the PVDF and MXD6 electrospun fiber mats were evenly embedded in the PAA/clay membranes and maintained their inter-bonded morphologies. In the PAA/MXD6-fiber/clay membrane, clay platelets effectively covered the pores among electrospun fibers due to their relatively large size (around 1 μm), and an SEM image showed constrained and isolated clay platelets. In the PAA/PVDF-fiber/clay membrane, the pores among PVDF fibers were much larger than clay platelets, so the clay platelets were well dispersed in the PAA gel and could not be observed in an SEM image.

Figure 13:
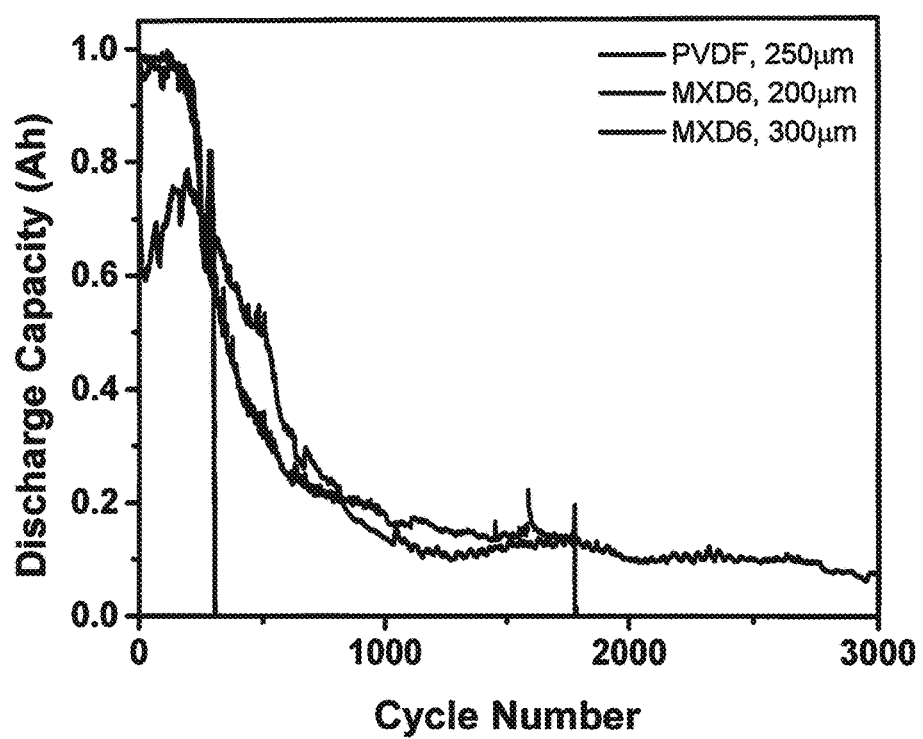
FIG. 13 is a graph showing a property for differing membranes with differing fiber thicknesses.

Charge-discharge battery testing was then carried out using these membranes. Two PAA/MXD6-fiber/clay membranes with thicknesses of 200 μm and 300 μm and a PAA/PVDF-fiber/clay membrane with a thickness of 250 μm were tested. These results are shown in FIG. 13. The 250 μm PVDF battery had a 95% discharge capacity in the first 200 charge-discharge cycles, and the discharge capacity dropped to 0 at the 301$^{st}$ cycle. The 200 μm MXD6 battery had almost 100% discharge capacity in the first 130 cycles, and then the discharge capacity gradually reduced. The battery still did not fail after 1500 cycles. For the 300 μm MXD6 battery, the discharge capacity started from a low level and slowly increased to 80% in the first 200 cycles. Then the battery showed a slowly decayed discharge capacity but it remained alive for more than 3000 cycles. The comparison of different membranes indicated that the ion transportation in the membrane was an important factor for the discharge capacity, as thinner membrane exhibited higher initial discharge capacity. PAA/MXD6-fiber/clay membrane showed better cycle life in a Ni—Zn rechargeable battery than PAA/PVDF-fiber/clay membrane. This is believed to be due to the MXD6 electrospun fibers having small fiber diameter and small pore size leading to better dendrite inhibition.

From SEM observations, the 250 μm PAA/PVDF-fiber/clay membrane showed a large amount of Zn dendrites among the PVDF fibers, the dendrites having diameters in the range from 200 nm to 700 nm, after 301 charge-discharge cycles. In both the 200 μm and the 300 μm PAA/MXD6-fiber/clay membranes, the electrospun fibers were tightly bonded after over 1000 charge-discharge cycles, and only a small amount of Zn dendrites with a diameter of about 100 nm were found to have penetrated through the membrane.

Example H

PAA/Fiber/Clay Multilayer Polymer Electrolyte Membrane

A PAA/MXD6-fiber/clay multilayer membrane was obtained by laminating a PAA/9 vol % MXD6-fiber layer and a PAA/3.8 vol % clay layer. In this multilayer membrane, the PAA/fiber layer occupied around 75% thickness, while the PAA/clay layer held about 25% thickness. Both layers maintained the same morphologies as they were separated, and the interfacial adhesion between two layers was strong due to the same PAA matrix.

Figure 14:
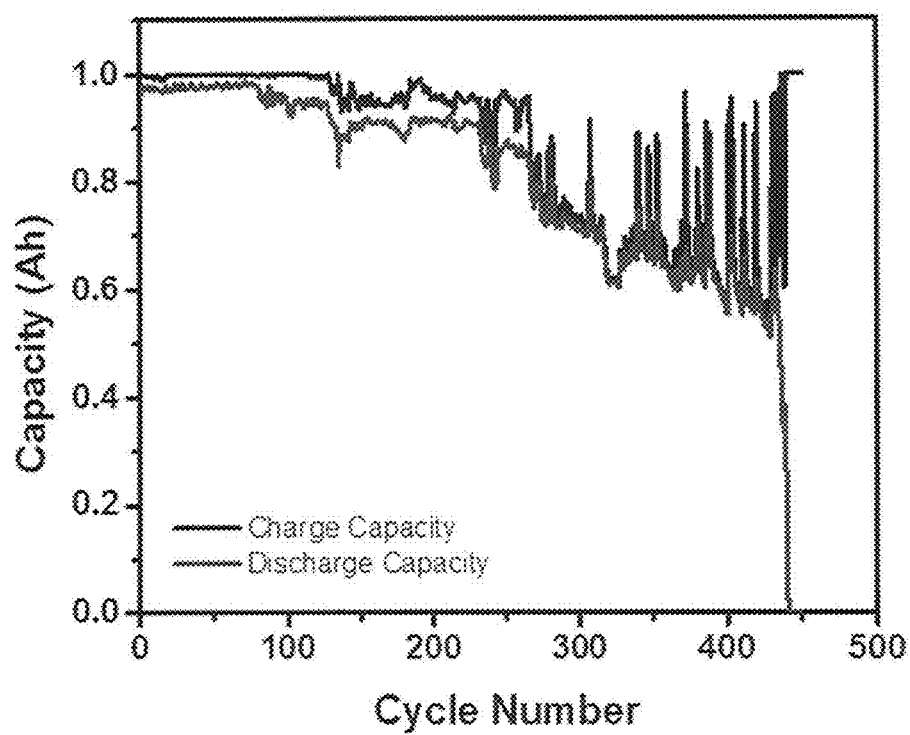
FIG. 14 is a graph showing a property for the charge and discharge performances of a PAA multilayer membrane having 9 vol.% MXD6 fiber and 3.8 vol.% clay.

In the charge-discharge battery testing, both charge capacity and discharge capacity remained at high levels in the first 130 cycles. Then with the increase of cycle number, the charge capacity fluctuated and gradually decreased, and the discharge capacity slowly reduced to 60%. At the 439$^{th}$ cycle, the discharge capacity suddenly dropped down to 0 and the battery failed due to short-circuit. Membrane analysis after battery testing proved that the battery failure mechanism was the battery short-circuit caused by Zn dendrite growth. These results are in FIG. 14.

Example I

Battery Production

For results above that involved the use of a battery, a Ni—Zn rechargeable battery was used and the battery was built by sandwiching a polymer electrolyte membrane between Ni and Zn electrodes. Then the battery was put in a polycarbonate case filled with 30 wt % KOH solution. Charge-discharge battery testing was conducted using MACCOR (Model 4300) Desktop Automated Test equipment. In the charging cycle, a constant current of 50% of the battery capacity (0.5 C) was applied to the battery, and the voltage was recorded. When the battery voltage reached 2 V, which was set as the ceiling voltage, the battery voltage was limited at this value by the machine until the charging time reached 2 hours or the current decayed to the value of 0.3 C. Then after 5 minutes rest, the discharging cycle began. The battery was discharged with a constant current of 0.5 C until the battery voltage dropped to 1.2 V which was set as the cut-off voltage. Then the discharging was stopped, and the charging cycle started again after 5 minutes rest. Before all the battery tests, two cycles of slow charging-discharging at the current of 0.2 C were carried out for activation.

Additional Results

Figure 7:
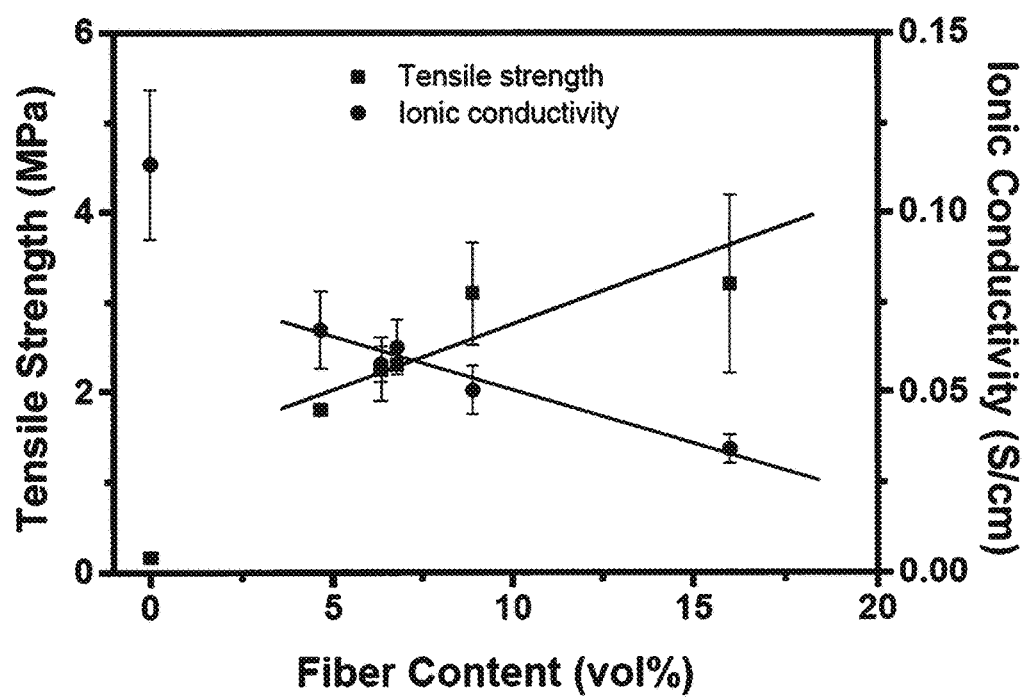
FIG. 7 is a graph showing properties using Nylon-MXD6 (m-xylenediamine) as an electrospun fiber.
Figure 8:
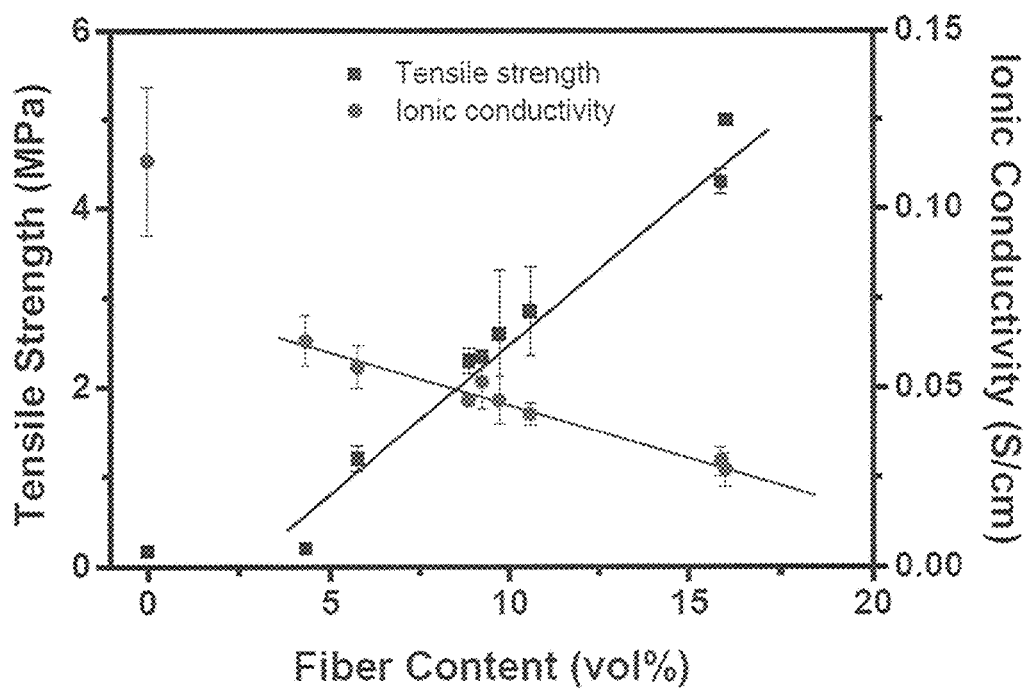
FIG. 8 is a graph showing properties using polyvinylidene difluoride (PVDF) as an electrospun fiber.

With the increase of fiber content, the fiber-reinforced polymer electrolyte membranes linearly increased the tensile strength and reduced the ionic conductivity, as shown in FIG. 7 for MXD6 and FIG. 8 for PVDF. As indicated previously, higher fiber content meant more interfiber bonds in the membrane, as interfiber bonds held the fibers together during solution casting and membrane swelling, leading to relatively low membrane thickness and high fiber content. When a membrane was stretched, interfiber bonds effectively transferred load and induced deformation resulting in high tensile strength. As to the ionic conductivity, the electrospun fibers increased the tortuosity of the membrane and hindered the transportation of ions. The fibers also reduced the swelling ratio, making the membrane become denser and absorb less KOH solution, leading to lower ionic conductivity.

Figure 11:
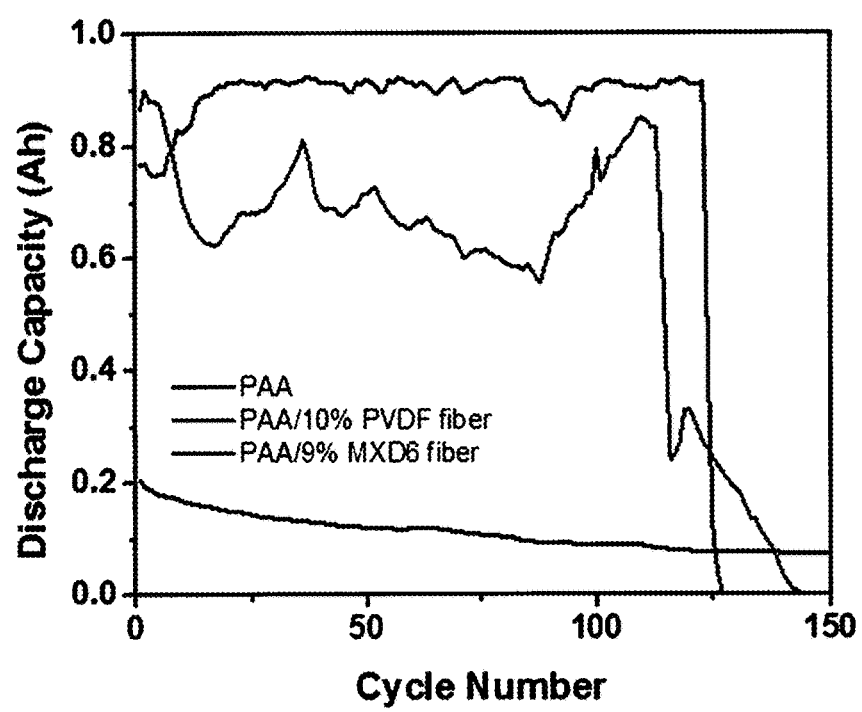
FIG. 11 is a graph showing a property for a PAA membrane with MXD6 fiber reinforcement, with PVDF fiber reinforcement, and without fiber reinforcement.

FIG. 11 shows discharge capacities as a function of cycle number for PAA membranes with and without fiber reinforcement. Here, 10 vol % PVDF-fiber-reinforced membrane and 9 vol % MXD6-fiber-reinforced membrane were used as electrolyte membranes for charge-discharge battery testing. The battery with PAA electrolyte membrane showed less than 0.2 Ah discharge capacity, although the designed capacity was 1 Ah. For the battery with PVDF-fiber-reinforced membrane (fiber diameter: 1260 nm), the discharge capacity was close to 0.9 Ah in early cycles, and decreased and became unstable afterward. After 115 charge-discharge cycles, the discharge capacity drastically dropped to a low level, indicating the penetration of the membrane by Zn dendrite growth. For the battery with MXD6-fiber-reinforced membrane (fiber diameter: 550 nm), the discharge capacity increased from 0.75 Ah to 0.9 Ah within the first 20 cycles, and kept the high value until the sudden battery failure at the 124$^{th}$ cycle. The stable cycle performance revealed the good contact between electrolyte membrane and electrodes as well as effective inhibition against Zn dendrite growth.

Table 1 below provides further results for certain tested examples.

| Membrane | Thickness (μm) | Ionic Conductivity (S/cm) | Tensile Strength (MPa) | Battery Failure Cycle Life (cycle) | Battery Life (cycle) | Dendrite Inhibition Efficiency (cycle/μm) |
|---|---|---|---|---|---|---|
| PAA | 400 | 0.11 | 0.17 | — | 10 | 0.03 |
| PAA/3.8% clay | 200 | 0.06 | 0.11 | 130 | 130 | 0.65 |
| PAA/10% PVDF-fiber | 250 | 0.05 | 2.55 | 142 | 115 | 0.46 |
| PAA/10% PVDF-fiber/3.8% clay hybrid | 250 | 0.02 | 1.78 | 306 | 301 | 1.20 |
| PAA/9% MXD6-fiber | 250 | 0.05 | 3.10 | 127 | 124 | 0.50 |
| PAA/9% MXD6-fiber/3.8% clay (hybrid-a) | 200 | 0.02 | 2.68 | 1780 | 531 | 2.66 |
| PAA/9% MXD6-fiber/3.8% clay (hybrid-b) | 300 | 0.02 | 2.68 | — | 628 | 2.09 |
| PAA/9% MXD6-fiber/3.8% clay (multilayer) | 400 | 0.03 | 1.54 | 441 | 439 | 1.10 |

In light of the foregoing, it should be appreciated that the present invention significantly advances the art by providing improved electrolyte membranes. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. An electrolyte membrane for use in a rechargeable battery comprising a first polymer layer formed of poly (acrylic acid) and reinforced with a fiber mat made from polymeric fibers formed of a polymer selected from the group consisting of polyvinylidene difluoride and the semi-crystalline polyamide resin nylon-MXD6, a second polymer layer formed of poly(acrylic acid) and positioned on the first polymer layer, wherein the second polymer layer includes nanoclay platelet particles, wherein the first polymer layer and the second polymer layer retain potassium hydroxide as an electrolyte, wherein the first polymer layer is devoid of nanoclay platelet particles and the second polymer layer is devoid of a fiber mat made from polymer fibers, and wherein the first polymer layer forms an outer layer of the electrolyte membrane.

2. The membrane of claim 1, wherein the platelet particles are dispersed throughout the second polymer layer.

3. The membrane of claim 1, the electrolyte membrane having a thickness, wherein the first polymer layer reinforced with the fiber mat makes up from 65% to 80% of the thickness of the electrolyte membrane, and wherein the second polymer layer makes up the remainder of the thickness of the electrolyte membrane.

4. The membrane of claim 1, wherein the polymeric fibers are formed of polyvinylidene difluoride.

5. The membrane of claim 1, wherein the polymeric fibers are formed of the semi-crystalline polyamide resin nylon-MXD6.

6. The membrane of claim 1, the fiber mat being formed of polymeric fibers having a diameter of 1 μm or less.

7. The membrane of claim 1, the fiber mat being formed of polymeric fibers having a diameter of 300 nm or less.

8. The membrane of claim 1, wherein the electrolyte membrane includes from 5 or more to 15 or less vol. % polymeric fibers and from 1 or more to 5 or less vol. % nanoclay platelet particles.

9. A rechargeable battery comprising a positive electrode and a negative electrode, the membrane of claim 1 being positioned between the positive electrode and the negative electrode of the rechargeable battery, the membrane adapted to act as an ion conductor for the battery.

10. The rechargeable battery of claim 9, wherein the rechargeable battery is a nickel-zinc rechargeable battery.

11. The rechargeable battery of claim 9, the membrane having a thickness of from 100 μm or more to 500 μm or less.

12. A rechargeable battery comprising a positive electrode and a negative electrode, a membrane positioned between the positive electrode and the negative electrode and adapted to act as an ion conductor for the rechargeable battery, the membrane comprising a polymer layer including a plurality of platelet particles therein to thereby prevent or minimize dendrite growth, the polymer layer further comprising a fiber mat made from polymeric fibers to thereby reinforce the polymer layer, the polymer layer further retaining an electrolyte, and the polymer layer including about 10 vol. % polyvinylidene difluoride (PVDF) fibers and about 3.8 vol. % nanoclay platelet particles.

13. A rechargeable battery comprising a positive electrode and a negative electrode, a membrane positioned between the positive electrode and the negative electrode and adapted to act as an ion conductor for the rechargeable battery, the membrane comprising a polymer layer including a plurality of platelet particles therein to thereby prevent or minimize dendrite growth, the polymer layer further comprising a fiber mat made from polymeric fibers to thereby reinforce the polymer layer, the polymer layer further retaining an electrolyte, and the polymer layer including about 9 vol. % fibers and about 3.8 vol. % nanoclay platelet particles, wherein the fibers are made from the semi-crystalline polyamide resin nylon-MXD6.

* * * * *